United States Patent [19]

Leon

[11] Patent Number: 4,832,226
[45] Date of Patent: May 23, 1989

[54] SELF-DRAINING POT APPARATUS

[76] Inventor: John F. Leon, P.O. Box 160, Tryon, N.C. 28782

[21] Appl. No.: 186,301

[22] Filed: Apr. 26, 1988

[51] Int. Cl.$^4$ .................... A47J 27/10; B65D 25/38
[52] U.S. Cl. .................................... 220/264; 99/403;
  99/450; 126/377; 210/245; 210/464; 220/94 R;
  222/473; 222/505
[58] Field of Search ................. 99/403, 407, 409, 410,
  99/418, 450; 126/361, 369, 369.2, 377; 210/245,
  464, 465, 469; 220/1 C, 94 R, 202, 262–264,
  DIG. 6; 222/469, 470, 472–474, 505, 508

[56] References Cited

U.S. PATENT DOCUMENTS

| 563,136 | 6/1896 | Caswell | 210/464 |
|---|---|---|---|
| 1,354,085 | 9/1920 | Zisk | 210/245 |
| 1,646,614 | 10/1927 | Frye et al. | 222/47 X |
| 1,759,121 | 5/1930 | Lamplota | 210/465 |
| 1,808,024 | 6/1931 | Donley | 222/505 |
| 2,067,554 | 1/1937 | Vahle | 222/508 |
| 2,579,258 | 12/1951 | Heckert | |
| 2,638,839 | 5/1953 | Raiteri | |
| 3,592,668 | 7/1971 | Denk | |
| 3,808,963 | 5/1974 | Ludena | |
| 3,859,505 | 1/1975 | Herbrand | |
| 4,040,964 | 8/1977 | Hegyi | 210/469 |

Primary Examiner—Jimmy G. Foster
Attorney, Agent, or Firm—Leon Gilden

[57] ABSTRACT

A self-draining pot apparatus is set forth wherein a cooking vessel is formed with a pivotally and normally biased closure overlying, in a sealing arrangement, a plurality of openings enabling draining of fluid contained in said vessel during a cooking procedure. A removable screen oriented at an elevated position within said vessel enables steaming of various foods, such as vegetables, positionable on said screen. A finger lever positioned within a handle integrally secured to said vessel has secured thereto a flexible tether engaging said closure to enable opening of said closure and draining of the fluid within said vessel.

10 Claims, 1 Drawing Sheet

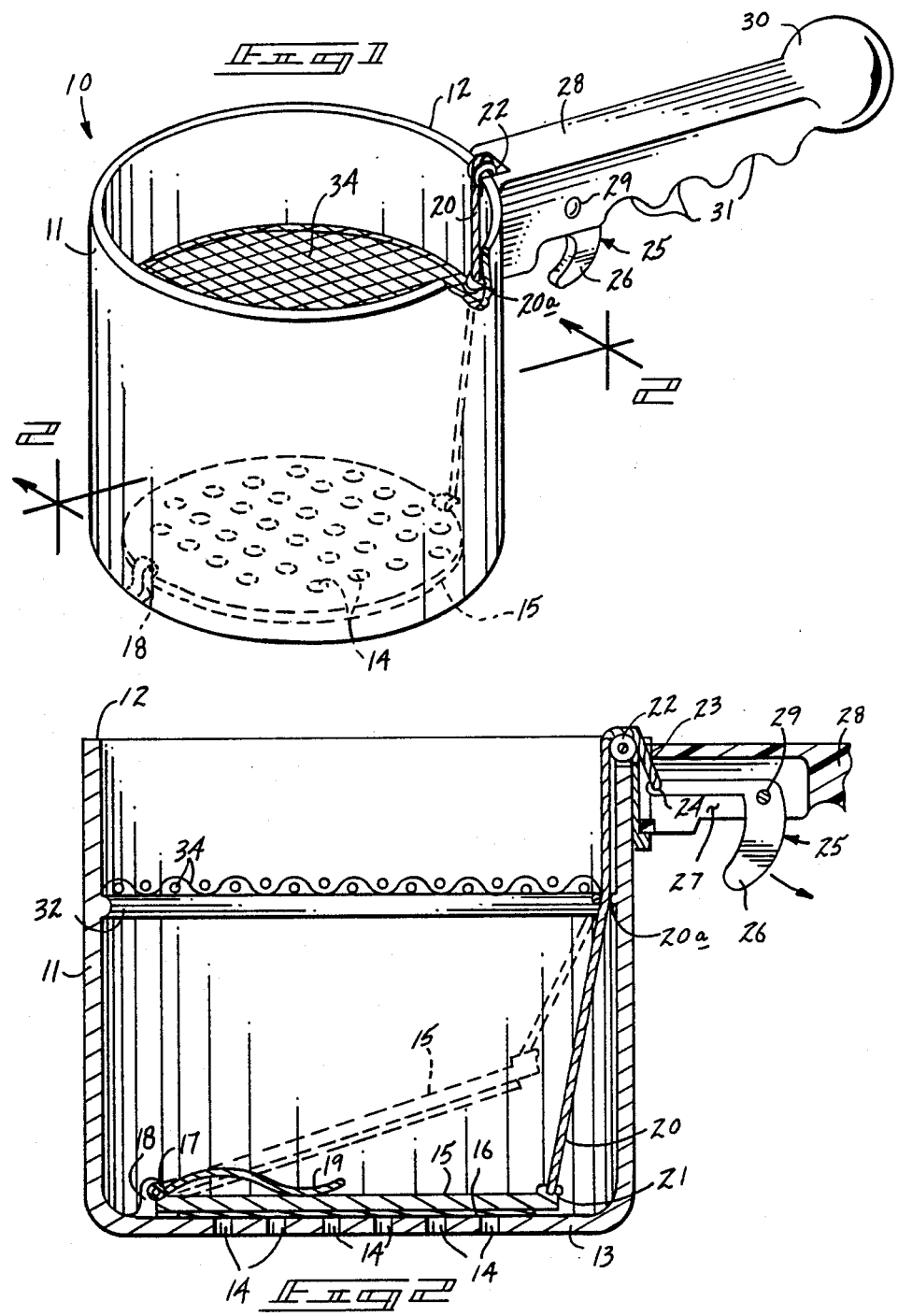

SELF-DRAINING POT APPARATUS

BACKGROUND OF THE INVENTION

1. Field of the Invention

The present invention relate to cooking vessels, and more poarticularly pertains to a new and improved self-draining pot apparatus which enables the cooking and steaming of food within said vessel with the subsequent draining of fluid utilized in the cooking procedure through floor mounted openings within said vessel.

2. Descriptoin of the Prior Art

The use of cooking vessels of various types is well known in the prior art. As may be appreciated, the cooking vessels utilized particularly with the steaming and boiling of foods, such as vegetables, has presented a somewhat cumbersome arrangement upon the culmination of the cooking procedure requiring draining of the aforenote fluid, such as water. Understandably, this fluid is of an elevated temperature and the removal thereof presents potential danger of contact with a user therof during a disposal procedure. Multi-purpose cooking vessels have been utilized in the prior art and in this connection there have been attempts to develop multi-purpose vessels which may be utilized for dual purposes, such as U.S. Pat. No. 2,579,258 to Heckert wherein a griddle arrangement formed with a handle has associated therewith a spatula nestable within the griddle provided with a conduit directed channel at a plurality of corners of the griddle to enable removal of grease within the griddle or vessel. The spatula handle and the griddle handle are nestable one upon the other for convenience of plural usage of the associated apparatus. While an effective solution for the use of a griddle and an enclosed spatula arrangement, the Heckert patent provides only a means of directing grease from within the griddle and not any means of providing a draining thereof without the associated tipping and manipulation of the vessel itself.

U.S. Pat. No. 2,638,839 to Raiteri sets forth a beverage urn wherein a valve and a conduit is provided in an underlying relationship to the beverage urn to release of fluid within the urn. The Raiteri patent, while of interest relative to the utilization of a valving arrangement, is formed with a chamber associated with a conduit valve directing such water to a coffee making organization and accordingly is of an organization and apparatus relatively remote from the instant invention.

U.S. Pat. No. 3,592,668 to Denk provides a pressure cooking vessel providing for selective discharge of fluid within the vessel wherein enclosed foods within the vessel are subject to accelerated cooking time while simultaneously circulating heat energy, cooling the foods, and discharging the heat and pressure as desired, but the Denk patent is of a relatively complex organization for a function relatively remote from that of the instant invention and is accordingly of interest only to the general recitation of a fluid removal vessel.

U.S. Pat. No. 3,808,963 to Ludena sets forth an outer container fitted with an inner container therein defining a space therebetween enabling steam from thh boiling water secured between the two vessels to enter perforations and effect the cooking operation. While an effective steaming and cooking organization, the Ludena patent fails to provide means for removal of fluid subsequent to the steaming procedure.

U.S. Pat. No. 3,859,505 to Herbrand sets forth a boiler appartus to enable the boiling and cooking of individual jars therein with associated racks and lids and are provided with a spigot positioned at an underlying relation to enclose fluid to enable discharge of said fluid upon the cooking operation. The Herbrand patent provides a fluid removal valve, but is of a relatively crude and awkward organization relative to the instant invention.

As such, it may be appreciated that there is a continuing need for a new and improved self-draining pot apparatus which addresses both the problem fo effectiveness of cooking and subsequent draining of cooking fluid, and in this respect the present invention substantially fulfils this need.

SUMMARY OF THE INVENTION

In view of the foregoing disadvantages inherent in the known types of cooking vessels now present in the prior art, the present invention provides an self-draining pot apparatus wherein the same may be effectively and efficiently utilized for the steaming and processing of foods therein and may further readily drain a cooking medium within said vessel subsequent to the cooking operation. As such, the general purpose of the present invention, which will be described subsequently in greater detail, is to provide a new and improved self-draining pot apparatus which has all the advantages of the prior art cooking vessels and none of the disadvantages.

To attain this, the present invention comprises a self-draining pot apparatus provided with a closure lid normally biased in a closed operation wherein said lid is formed with a sealing member to normally seal the interior of said vessel when said lid is in a normally closed position overlying a plurality of apertures within the floor of said vessel. A removable steamer rack is provided wiht an indentation enabling a tether line secured at one end to the closure end and at another end to a finger release lever mechanism positoned within a handle integrally secured to the vessel to enable selective opening of the closure lid.

My invnetin resides not in any one of these features per se, but rather in the particular combination of all of them herein disclosed and claimed and it is distinguished from the prior art in this particular combination of all of its structures for the functions specified.

There has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature ane essence of the technical disclosure the application. The abstract is neither intended to define the invention of the application, which is measured by the claims, nor is it intended to be limiting as to the scope of the inventio in any way.

It is therefore an object to the present invention to provide a new and improved self-draining pot apparatus which has all the advantages of the prior art self-draining pot apparatus and none of the disadvantages.

It is another object of the present invention to provide a new and improved self-draining pot apparatus which may be easily and efficiently manufacture and marketed.

It is a further object of the present invention to provide a new and improved self-draining pot apparatus which is of a durable and reliable construction.

An even further object of the present invention is to provide a new and improved self-draining pot apparatus which is susceptible of a low cost of manufacture with regrad to both materials and labor, and which accordingly is then susceptible of low prices of sale to the consuming public, thereby making such self-draining pot apparatus economically available to the buying public.

Still yet another object of the present invention is to provide a new and improved self-draining pot apparaus which provides in the apparatuses and methods of the prior art some of the advantages thereof, while simultaneously overcoming some of the disadvantages normally associated therewith.

Still another object of the present invention is to provide a new and improved self-draining pot apparatus provided with a closure lid in a normally biased and sealing overlying relationship to a plurality of apertures within the floor of the vessel.

Yet another object of the present invention is to provide a new and improved self-draining pot apparatus wherein a flexible line is secured to a closure lid at one end and to a lever release mechanism positioned within a handle of the associated vessel to enable selective opening of the closure lid and draining of cooking fluid or water positioned within the steamer vessel.

Even still another object of the present invention is to provide a new and improved self-draining pot apparatus wherein an overlying steamer tray is provided with an indentation enabling passage of a tether line to manipulate the closure lid of the instant invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention with a section partially removed to illustrate the various poarts, their configuratin, and relationship.

FIG. 2 is an orthographic view taken in elevation of the instant invention along the lines 2—2 of FIG. 1 in the direction indicated by the arrows.

DESCRIPTION OF THE PREFERRED EMBODIMENT

With the reference now to the drawings, and in particular to FIGS. 1 and 2 thereof, a new and improved self-draining pot apparatus embodying the principles and concepts of the presnt invention and generally designated by the reference numeral 10 will be described.

More specifically, it will be noted that the self-draining pot apparatus 10 is formed with a continuous vertical wall 11 terminating in an upper edge 12 and formed with an integral floor 13.

Formed within the floor 13 are a matrix of apertures 14 wherein an overlying closure lid 15 is formed with a high temperature resistant plastic-like planar gasket 16. The closure lid 15 is secured to a pivot 17 oriented parallel to the floor 13 and positioned through an upstanding boss 18 integrally secured to the floor 13. A closure spring 19 secured to said boss 18 at one end and in overlying relationship to the closure lid 15 at the other normally biases the closure lid 15 in an orientation generally as illustrated in FIG. 2 to sealingly prevent fluid from entering the apertures 14 prior to the upper pivoting of the closure lid 15, as illustrated in phantom in FIG. 2.

A flexible tether line 20 is secured to the closure lid 15 at a closure lid opening 21 at one end of said tether line and is directed upwardly along the wall 11 of the apparatus 10 over a cooperative rotating pulley 22 positioned within a recessed notch 23 in the edge 12.

A finger lever opening 24 wihtin an "L" shaped finger lever 25 accepts the other end of the tether line 20. The "L" shaped finger lever 25 is forned with a downwardly extending arcuate finger grip 26 wherein the finger lever 25 is positioned within a recess 27 of handle 28 and secured hereto by a through extending pivot 29. The pivot 29 and the pivot axis of pulley 22, as well as the pivot 17 of closure lid 15, are aligned and parallel to enable a snag-free and smooth operation of the selective opening of closure lid 15 by manipulation of the "L" shaped finger lever 25.

Handle 28 fo the self-draining pot apparatus 10 is formed with a bulbous end 30 to prevent accidental slippage of a user's hand from about the handle 28 and additionally is formed with a plurality of underlying finger grip rcessed 31 to enhance securement of handle 28.

An integrally directed circumferential rib 32, as illustrated in FIG. 2, is positioned within an interior surface of the continuous wall 11 and is formed with a discontinuity 32a cooperative with a continuity illustrated as a scfreen recess 34a of steaming stream 34 to enable passage of the tether line 20 therethrough wherein a securement loop 28 integrally formed to an interior surface of wall 11 adheres and maintains the tether line 20 along and proximate to an inner surface of the aforenoted wall 11. This securement of 20a is also in alignment with the aforenoted axis 17, axis of pulley 22, and pivotal axis 29 of the "L" shaped finger lever 25.

The usage and operation of the instant invention should be apparent from the above description whreein upon culimination of a cooking procedure of water for example within the interior of the self-draining pot apparatus 10, a user merely repositions the pot apparatus 10 over a drain surface and merely grips the finger grip 26 to reposition same generally in the direction as indicated by the arrow of FIG. 2 whereupon the closure lid 15 will pivot upwardly and enable the fluid to drain through the plurality of matrix apertures 14.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A self-draining pot apparatus for selective release of cooking fluid contained within said pot comprising, an upstanding continuous vertical wall terminating in an upper edge and wherein said wall is integrally secured to an underlying floor means orthogonally oriented relative to said wall for positioning on a support surface;
   a handle means orthogonally secured to said vertical wall, and
   valve means pivotally secured to said floor means, and
   manually manipulatable means secured to said handle means for selectively lifting said valve means relative to said floor means to enable said cooking fluid to drain through said floor means.

2. A self-draining pot appartus as set forth in cliam 1 wherein said valve means comprises a planar lid pivotally secured by means of a plate axis wherein said plate axis is parallel to said floor means wherein an upstanding boss includes said plate axis and said upstanding boss is integrally secured to said floor means.

3. A self-draining pot apparatus as set for in claim 2 wherein a closure spring is secured to said upstanding boss and is positioned in overlying relationship to said lid to normally bias said lid adjacent said floor means.

4. A self-draining pot apparatus as set forth in claim 3 wherein said floor means is formed with a matrix of apertures extending through said floor measn in underlying relationship to said lid.

5. A self-draining pot apparatus as set forth in claim 4 wherein a flexible tether line is secured to said lid at one end thereof and extends upwardly along an interior surface of said wall, and a pulley positioned within a recess of said wall accepting said line thereover, wherein another end of said line is secured to a finger lever positioned within a recess within said handle means.

6. A self-draining pot apparatus as set forth in claim 5 wherein said finger lever is secured to said handle means by a finger lever axis extending through said finger lever and said handle means and wherein said finger lever axis, said pulley axis, and said plate axis are parallel to one another and in general alignment with one another.

7. A self-draining pot apparatus as set forth in claim 6 wherien an integrally extending discontinuous rib is positioned within an interior surface of said upstanding wall for accepting a steaming screen of a diameter greater than said rib.

8. A self-draining pot apparatus as set forth in claim 7 wherein said steaming screen and said rib are formed with an aligned discontinuity for enabling passage of said line therethrough.

9. A self-draining pot apparatus as set forth in claim 8 wherein a securement loop integrally secured to the interior surface of said wall contains said line and maintains said line against the interior surface of said wall.

10. A self-draining pot apparatus as set forth in claim 9 wherein said handle means includes an enlarged bulbous end and a plurality of finger grip recesses to enhance securement of said handle means.

* * * * *